(12) United States Patent
Barney

(10) Patent No.: US 7,657,476 B2
(45) Date of Patent: Feb. 2, 2010

(54) METHOD AND SYSTEM FOR VALUING INTANGIBLE ASSETS

(75) Inventor: Jonathan A Barney, Newport Beach, CA (US)

(73) Assignee: PatentRatings, LLC, Newport Beach, CA (US)

(*) Notice: Subject to any disclaimer, the term of this patent is extended or adjusted under 35 U.S.C. 154(b) by 226 days.

(21) Appl. No.: 11/614,878

(22) Filed: Dec. 21, 2006

(65) Prior Publication Data

US 2007/0150298 A1 Jun. 28, 2007

Related U.S. Application Data

(60) Provisional application No. 60/754,525, filed on Dec. 28, 2005.

(51) Int. Cl.
*G06Q 40/00* (2006.01)

(52) U.S. Cl. ............................. 705/35; 705/1; 705/36 R

(58) Field of Classification Search .............. 705/35–45
See application file for complete search history.

(56) References Cited

U.S. PATENT DOCUMENTS

| 6,018,714 | A | 1/2000 | Risen, Jr. et al. |
| 6,154,725 | A * | 11/2000 | Donner ........................... 705/1 |
| 6,175,824 | B1 * | 1/2001 | Breitzman et al. ........ 705/36 R |

(Continued)

FOREIGN PATENT DOCUMENTS

WO    WO2005050512    *    6/2005

OTHER PUBLICATIONS

LPS Group Launches Patent Triage, a Revolutionary Alternative to Patent Abandonment, New York—(Business Wire)—Apr. 17, 2001.*

(Continued)

*Primary Examiner*—Narayanswamy Subramanian
*Assistant Examiner*—Robert R Niquette
(74) *Attorney, Agent, or Firm*—Knobbe, Martens, Olson & Bear LLP

(57) ABSTRACT

The present invention provides a method and system for valuing patent assets based on statistical survival analysis. An estimated value probability distribution curve is calculated for an identified group of patent assets using statistical analysis of PTO maintenance fee records. Expected valuations for individual patent assets are calculated based on a the value distribution curve and a comparative ranking or rating of individual patent assets relative to other patents in the group of identified patents. Patents having the highest percentile rankings would be correlated to the high end of the value distribution curve. Conversely, patents having the lowest percentile rankings would be correlated to the low end of the value distribution curve. Advantageously, such approach brings an added level of discipline to the overall valuation process in that the sum of individual patent valuations for a given patent population cannot exceed the total aggregate estimated value of all such patents. In this manner, fair and informative valuations can be provided based on the relative quality of the patent asset in question without need for comparative market data of other patents or patent portfolios, and without need for a demonstrated (or hypothetical) income streams for the patent in question. Estimated valuations are based simply on the allocation of a corresponding portion of the overall patent value "pie" as represented by each patents' relative ranking or position along a value distribution curve.

11 Claims, 7 Drawing Sheets

U.S. PATENT DOCUMENTS

| | | |
|---|---|---|
| 6,556,992 B1 | 4/2003 | Barney et al. |
| 6,879,990 B1 * | 4/2005 | Boyer et al. ................. 707/205 |
| 2003/0028460 A1 * | 2/2003 | Kraemer ....................... 705/36 |
| 2003/0212572 A1 * | 11/2003 | Poltorak ........................ 705/1 |
| 2004/0010393 A1 | 1/2004 | Barney |
| 2004/0068453 A1 * | 4/2004 | Duan et al. ................... 705/35 |
| 2004/0220842 A1 | 11/2004 | Barney |
| 2005/0010515 A1 * | 1/2005 | Woltjen ....................... 705/36 |
| 2006/0036529 A1 * | 2/2006 | Williams .................. 705/36 R |
| 2008/0091620 A1 * | 4/2008 | Vollenweider et al. .... 705/36 R |

OTHER PUBLICATIONS

U.S. Appl. No. 11/517,067, filed Sep. 7, 2006, Barney.
International Search Report and Written Opinion for PCT Application No. PCT/US 06/48774 dated Feb. 13, 2008.

* cited by examiner

METHOD AND SYSTEM FOR VALUING INTANGIBLE ASSETS

CROSS-REFERENCE TO RELATED APPLICATIONS

This application claims the benefit of U.S. Provisional Application No. 60/754,525, filed Dec. 28, 2005.

BACKGROUND OF THE INVENTION

1. Field of the Invention

The present invention relates to the field of asset valuation, and in particular to the field of valuing patent assets or other tangible or intangible assets subject to a periodic tax or renewal fee.

2. Description of the Related Art

Patents play an important role in our economy in encouraging private investment in new ideas and the development of new technologies that improve productivity and quality of life for everyone. Each year more than a quarter-million patent applications are filed in the United States Patent and Trademark Office ("PTO"), resulting in the issuance of over a hundred fifty-thousand patents annually. Patent owners and applicants pay combined fees and costs of over a billion dollars per year to the PTO to obtain and maintain their patents and applications. See, United States Patent & Trademark Office, FY 2000 USPTO Annual Report. Additional fees and costs are typically incurred for related professional services, such as attorneys fees, search fees, drafting charges and the like.

A recent survey conducted by the American Intellectual Property Law Association ("AIPLA") reported that the median fees charged by law firms for preparing and filing original utility patent applications in 1999 ranged between $4,008 and $7,993, depending upon subject matter and complexity. See, American Intellectual Property Law Association, Report of Economic Survey, pp. 63-63 (1999). In addition, patent owners bring thousands of infringement suits each year in the federal courts. In the twelve months ended June 1998 a total of 1,996 patent-related cases were filed in the United States Federal District Courts. See, Annual Report of Judicial Statistics for 1997, Vol. 1, Civil Cases. The median cost of these suits in 1999 was estimated at $1.5 million per side through trial and appeal. It can be conservatively estimated that the total aggregate costs for obtaining, maintaining and enforcing patents in 1999 exceeded about $5.5 billion.

Because of the great importance of patents in the both the U.S. and global economies there has been continued interest in quantifying the value of patents and their contribution to economic prosperity of the individuals or companies that hold and/or control them. Such information can be useful for a variety of purposes. For example, patent holders themselves may be interested in using such information to help guide future decision-making or for purposes of tax treatment, transfer pricing or settlement of patent license disputes. Financial advisors and investors may seek to use such information for purposes of comparative value analysis and/or to construct measures of the "fundamental value" of publicly traded companies for purposes of evaluating possible strategic acquisitions or as a guide to investment. Economists may seek to use patent valuations for purposes of economic forecasting and planning. Insurance carriers may use such valuations to set insurance policy premiums and the like for insuring intangible assets. See, for example, U.S. Pat. No. 6,018,714, which is hereby incorporated herein by reference.

However, accurate valuing of patents and other intangible intellectual property assets is a highly difficult task requiring an understanding of a broad range of legal, technical and accounting disciplines. Intellectual property assets are rarely traded in open financial markets or sold at auction. They are intangible assets that secure unique benefits to the individuals or companies that hold them and/or exploit the underlying products or technology embodying the intellectual property. In the case of patent assets, for example, this unique value may manifest itself in higher profit margins for patented products, increased market power and/or enhanced image or reputation in the industry and/or among consumers or investors. These and other characteristics of intellectual property assets make such assets extremely difficult to value.

Patents derive unique value from the legal rights they secure, namely the right to exclude competition in the patented technology. This value (if any) usually manifests itself as a net increase in operating revenues resulting from either: (i) premium pricing of patented products or services; or (ii) royalty payments or other valuable consideration paid by competitors or other parties for use of the patented technology. Given these two inputs and the timing and probability of anticipated future revenue streams, an experienced valuation professional can readily estimate the value of a patent. See, Smith & Par, Valuation of Intellectual Property and Intangible Assets, 2nd Ed. (1989).

A familiar scenario is a patent licensed to a third party under an exclusive agreement that guarantees a predetermined income stream over a certain period of time. Using an income valuation approach, the intrinsic value of the licensed patent can be calculated simply as the net discounted present value of the future projected cash flows. Similarly, if the patent owner is exploiting the patented technology itself, the value of the patent may be fairly estimated as the net discounted present value of the incremental profit stream (assuming one can be identified) attributable to the patent over the remaining life of the patent or the economic life of the patented technology, whichever is shorter.

In these and similar scenarios where specific anticipated economic benefits can be identified and attributed to a particular intellectual property asset, accurate and credible estimations of value can be calculated using a traditional income valuation approach. In many cases, however, it is exceedingly difficult to identify with a desired degree of certainty a definite income stream or other anticipated economic benefit attributable to a particular intellectual property asset of interest. The classic example is a newly issued patent or an existing patent covering technology that, for whatever reason, has yet to be commercialized. In these and similar cases involving "unproven" patent assets the income valuation approach is less useful. The more tenuous the connection is between current revenues and anticipated future revenues, the more speculative the income valuation approach becomes.

For example, one popular approach involves guestimating "hypothetical" future license fees or royalties based on available data obtained from private license agreements and/or litigation settlements/awards involving patents in a similar technical field. While such analysis may be useful in certain cases, it suffers from several drawbacks that can lead to significant inaccuracies. One drawback is the inherent selection bias in the comparative data used to calculate hypothetical future license fees or royalties. By definition, all of the patents in the comparison group have been licensed, litigated and/or otherwise commercialized. This creates a "high-value" selection bias because most patents within the general population of patents are never licensed, litigated or commercialized at all. Thus, the approach will tend to over-value many patent assets. The approach also does not attempt to distinguish between similar patents based on underlying quality, breadth of claims, etc. Rather, the approach assumes that patents are fungible assets and that any one patent has essentially the same income earning potential as any other patent within the same field.

The reality is that every patent is unique. There are good patents and bad patents; broad patents and narrow patents; patents that are well-drafted and prosecuted and others that are not so well-drafted or prosecuted. Two patents in the same industry and relating to the same general subject matter can command drastically different royalty rates in a free market (or damage awards in litigation) depending upon subtle differences that affect the comparative breadth and defensibility of each patent.

Where there is enough money at stake, one or more patent lawyers can be engaged to analyze an individual patent and render a legal opinion, including an assessment of overall patent quality. But, such qualitative assessments are difficult to quantify in a way that lends itself to patent valuation analysis. Legal opinions are also inherently subjective, leaving the possibility for inconsistencies in assessed patent quality from attorney to attorney or from firm to firm.

What is needed is a purely objective approach for comparatively rating and valuing patents (particularly unproven patent assets) in a way that overcomes the above-noted problems and limitations.

SUMMARY OF THE INVENTION

The systems and methods of the present invention are related to those described in co-pending patent application 10/397,053, filed on Mar. 25, 2003 and published as 2004/0010393, the entire contents of which are hereby incorporated herein by reference.

The present invention provides a method and system for valuing patent assets based on reported abandonment rates of patents sharing statistically similar attributes. The invention provides new and valuable information that can be used by patent valuation experts, investment advisors, economists and others to help guide future patent investment decisions, licensing programs, patent appraisals, tax valuations, transfer pricing, economic forecasting and planning, and even mediation and/or settlement of patent litigation lawsuits In one embodiment the invention provides a method for calculating an estimated value probability distribution curve for an identified group of patent assets using statistical analysis of PTO maintenance fee records.

In another embodiment the invention provides a method for calculating an expected value for individual patent assets based on a calculated value probability distribution and a comparative ranking or rating of individual patent assets derived from objective patent characteristics or "metrics" statistically linked to either high or low maintenance rates. Baseline valuations for individual patents in the population are estimated by mapping each patent to the value distribution curve according to its determined percentile ranking. Patents having the highest percentile rankings would be correlated to the high end of the value distribution curve. Conversely, patents having the lowest percentile rankings would be correlated to the low end of the value distribution curve.

In accordance with another embodiment the invention provides a method for valuing individual patent assets based on a determined value probability distribution and a calculated rating or ranking. In accordance with the method, a first population of patents is selected having a first quality or characteristic and a second population of patents is selected having a second quality or characteristic that is different from the first quality or characteristic. Statistical analysis is performed to determine or identify one or more patent metrics having either a positive or negative correlation with either said first or second quality to a statistically significant degree. A regression model is constructed using the identified patent metric(s). The regression model is iteratively adjusted to be generally predictive of either the first or second quality being present in a given patent. The regression model is used to automatically rate or rank patents by positively weighting or scoring patents having the positively correlated patent metrics and negatively weighting or scoring patents having the negatively correlated patent metrics ("positive" and "negative" being used here in the relative sense only). Expected values for individual patent assets are estimated using the value probability distribution and the comparatively ranking or rating for each individual patent asset.

In accordance with another embodiment the invention provides a method for valuing individual selected patents. A patent value distribution curve and/or data representative thereof is provided. The shape of the curve generally represents an estimated distribution of patent value according to percentile rankings within a predetermined patent population. The area under the curve is generally proportional to the total approximated value of all patents in the predetermined patent population. Individual selected patents from the population are ranked in accordance with selected patent metrics to determine an overall patent quality rating and ranking for each individual selected patent. The patent value distribution curve is then used to determine a corresponding estimated value for an individual selected patent in accordance with its overall patent quality ranking. If desired, the method may be used to generate a patent valuation report including basic information identifying a particular reported patent or patents of interest and one or more valuations determined in accordance with the method described above.

Advantageously, such an allocative valuation approach brings an added level of discipline to the overall valuation process in that the sum of individual patent valuations for a given patent population cannot exceed the total aggregate estimated value of all such patents. In this manner, fair and informative valuations can be provided based on the relative quality of the patent asset in question without need for comparative market data of other patents or patent portfolios, and without need for a demonstrated (or hypothetical) income streams for the patent in question. Estimated valuations are based simply on the allocation of a corresponding portion of the overall patent value "pie" as represented by each patents' relative ranking or position along a value distribution curve.

In an alternative embodiment, an estimated value for a single patent asset can be converted to a non-currency-denominated scale centered on 1000 (or another convenient number). Thus, rather than representing a patent's value in absolute terms, the converted score allows a patent's value to be represented relatively with its peers. In some embodiments, the conversion scale is linear, thereby allowing converted scores of a plurality of patents to be added, subtracted, multiplied and divided.

In some embodiments, the converted score can be adapted to account for the relative value depreciation of a patent over time based on the calculated obsolescence rate for the particular technology. U.S. patent application Ser. No. 60/714,713, filed on Sep. 7, 2005 describes embodiments of a system for determining a rate of technology obsolescence from patent citation information.

In some embodiments, the methods described herein can be used to develop comparable objective quality ratings and value estimations for patents in any country or jurisdiction in the world. Value estimation scores for patents in any country or jurisdiction can be converted to a single scale, which can be weighted to remove the effects of exchange rates, thereby allowing objective comparison of the value of patents from any country or jurisdiction.

In certain embodiments, a method for estimating a value for a selected patent on a non-currency-denominated scale comprises estimating a value distribution curve, wherein the shape of the value distribution curve is determined to correspond to an estimated statistical distribution of expected patent values; determining a score for the selected patent based on one or more metrics determined to be statistically correlated to patent value; using the determined score and the estimated value distribution curve to determine an expected value for the selected patent, wherein the determined expected value is functionally correlated to said determined score; and converting the estimated expected value to a non-currency-denominated scale.

In certain embodiments, a method for comparing patent values between jurisdictions, comprises estimating patent values for at least a first group of patents issued in a first jurisdiction and a second group of patents issued in a second jurisdiction based on selected patent metrics; determining a first average converted value score for the first jurisdiction based on the estimated patent values for the first group of patents; determining a second average converted value score for the second jurisdiction based on the estimated patent values for the second groups of patents; and determining a patent exchange rate based on the first average converted value score, and the second average converted value score.

In certain embodiments, the estimating patent values of the first group of patents comprises estimating a value distribution curve, the shape of the value distribution curve is determined to correspond to an estimated statistical distribution of expected patent values; determining a score for the first group of patents based on one or more metrics determined to be statistically correlated to patent value; using the determined score and the estimated value distribution curve to determine expected values for the first group of patents, wherein the determined expected values are functionally correlated to the determined score; and converting the estimated expected values to a non-currency-denominated scale.

In certain embodiments, the first jurisdiction includes a different patent enforcement system than the second jurisdiction. In certain embodiments, the first jurisdiction employs a first official currency and the second jurisdiction employs a second official currency. In certain embodiments, the first official currency is available for purchase with the second official currency based on a currency exchange rate, wherein the method for comparing patent values between jurisdictions further comprises estimating a value for a first patent in terms of the second official currency based at least on the patent exchange rate and the currency exchange rate, wherein the first patent is subject to enforcement in the first jurisdiction.

In certain embodiments, the selected patent metrics of the method include one or more of the following: number of claims per patent, number of words per claim, different words per claim, length of patent specification, number of drawing pages or figures, number of cited prior art references, age of cited references, number of subsequent citations received, subject matter classification and sub-classification, origin of the patent, payment of maintenance fees, name of prosecuting attorney or law firm, examination art group, or length of pendency in a patent registration office. In certain embodiments, the estimating patent values of the first group of patents further comprises sending the patent exchange rate to an output device.

In certain embodiments, an apparatus for comparing patent values between jurisdictions comprises a processor; and a memory in communication with the processor, wherein the memory stores a plurality of processing instructions for directing the processor to estimate patent values for at least a first group of patents issued in a first jurisdiction and a second group of patents issued in a second jurisdiction based on selected patent metrics, wherein the memory stores the estimated patent values; determine a first average converted value score for the first jurisdiction based on the estimated patent values for the first group of patents, wherein the memory stores the first average converted value score; determine a second average converted value score for the second jurisdiction based on the estimated patent values for the group of patents, wherein the memory stores the second average converted value score; and determine a patent exchange rate based on the first average converted value score, and the second average converted value score, wherein the memory stores the patent exchange rate; and send the patent exchange rate to an output device.

In certain embodiments, the processing instructions for directing the processor to estimate patent values comprises estimating a value distribution curve, the shape of the value distribution curve is determined to correspond to an estimated statistical distribution of expected patent values; determining a score for the first group of patents based on one or more metrics determined to be statistically correlated to patent value; using the determined score and the estimated value distribution curve to determine expected values for the first group of patents, wherein the determined expected values are functionally correlated to the determined score; and converting the estimated expected value to a non-currency-denominated scale.

In certain embodiments, the first jurisdiction includes a different patent enforcement system than the second jurisdiction. In certain embodiments, the first jurisdiction employs a first official currency and the second jurisdiction employs a second official currency. In certain embodiments, the first official currency is available for purchase with the second official currency based on a currency exchange rate, and wherein the memory further stores a plurality of processing instructions for directing the processor to estimate a value for a first patent in terms of the second official currency based at least on said patent exchange rate and said currency exchange rate, wherein the first patent is subject to enforcement in the first jurisdiction; and send the estimated value for the first patent in terms of the second official currency to the output device.

In certain embodiments, the selected patent metrics of the apparatus include one or more of the following: number of claims per patent, number of words per claim, different words per claim, length of patent specification, number of drawing pages or figures, number of cited prior art references, age of cited references, number of subsequent citations received, subject matter classification and sub-classification, origin of the patent, payment of maintenance fees, name of prosecuting attorney or law firm, examination art group, or length of pendency in a patent registration office.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments and obvious variations thereof are intended to be within the scope of the invention herein disclosed. These and other embodiments of the present invention will become readily apparent to those skilled in the art from the following detailed description having reference to the attached figures, the invention not being limited to any particular preferred embodiment(s) disclosed.

BRIEF DESCRIPTION OF THE DRAWINGS

The accompanying drawings, which are incorporated in and constitute a part of this specification, illustrate several embodiments of the invention. Certain preferred embodiments and examples will now be described in detail having reference to the figures that follow, of which.

DETAILED DESCRIPTION OF THE PREFERRED EMBODIMENT

In the following description, for the purposes of explanation, numerous specific details are set forth in order to provide a thorough understanding of the present invention. It will be evident to one skilled in the art, however, that the exemplary embodiments may be practiced without these specific details. In other instances, structures and device are shown in diagram form in order to facilitate description of the exemplary embodiments.

Reference will now be made in detail to embodiments of the present invention, examples of which are illustrated in the accompanying drawings. Wherever possible, the same reference numbers will be used throughout the drawings to refer to the same or like parts.

Owners of U.S. patents are required to pay a periodic tax or "maintenance fee" during the term of a patent if they wish to maintain the patent in force. Maintenance fees are paid every four years and escalate progressively from $850 to maintain a patent in force beyond the fourth year, to $1,950 to maintain a patent in force beyond the eighth year, to $2,990 to maintain a patent in force beyond the twelfth year. The relatively substantial and escalating nature of the required maintenance fees has the natural effect of discouraging the maintenance of less valuable patents. This trend is borne out by the bar graph 100 of FIG. 1, which indicates average patent maintenance rates for a study population of about 70,000 patents issued in 1986. U.S. Patent & Trademark Office, Technology Assessment and Forecast Branch.

Figure 1:
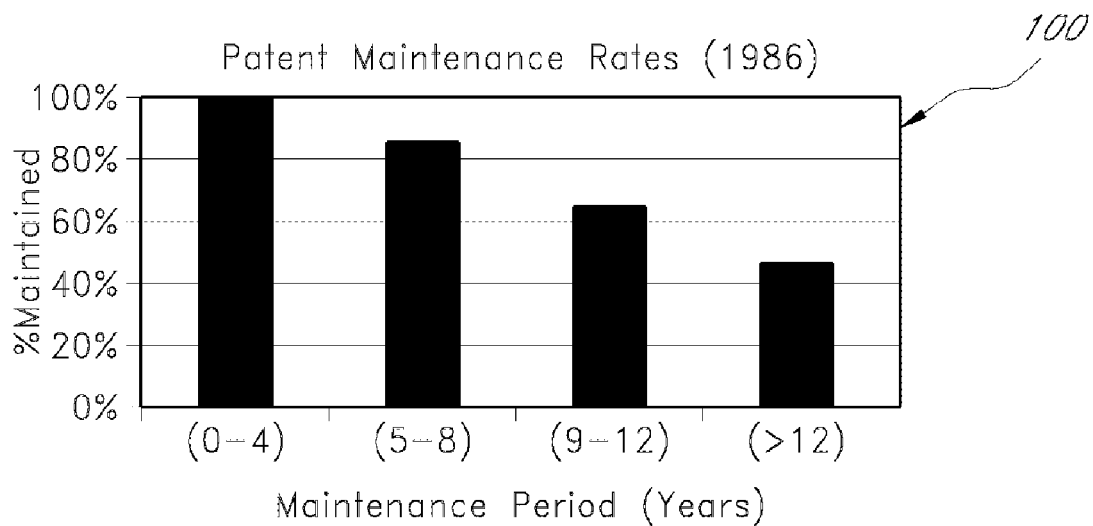
FIG. 1 is a graph of average patent maintenance rates for a study population of about 70,000 patents issued in 1986.

As FIG. 1 illustrates, approximately 83.5% of all patents issued in 1986 were maintained beyond the $4^{th}$ year, approximately 61.9% of the patents were maintained beyond the $8^{th}$ year and only approximately 42.5% of the patents were maintained beyond the $12^{th}$ year. In other words, all but about 42.5% of the original sample population were abandoned before the full statutory patent term, corresponding to an overall average patent mortality (abandonment) rate of approximately 57.5%.

The above data reports observed patent maintenance rates for patents in the study population according to official records maintained by the PTO. The invention disclosed and described herein assumes that individual patent decision-makers will (on average) choose to pay maintenance fees only when the perceived value of the expected remaining economic benefit secured by the patent exceeds the amount of the maintenance fee, taking into account appropriate risk factors, anticipated rates of return, etc. In other words, individuals and companies will invest in asset(s) only when the perceived value of the expected economic benefits secured by the asset(s) exceed the anticipated investment required to obtain and/or maintain the asset(s), taking into account appropriate risk factors, anticipated rates of return, etc. A rational economic decision-maker should choose to make additional incremental investments in a patent asset (i.e., payment of maintenance fees) only if he or she believes that the patent will produce expected future economic benefits sufficient to justify the further investment.

Of course, not necessarily all relevant decision-makers will behave rationally and economically in all cases. For a variety of reasons, individual decision-makers may choose to invest uneconomically in patents or other intellectual property assets, for example, to achieve personal recognition or to superficially "dress up" balance sheets to attract potential investors or buyers. Human nature being what it is, a variety of individual psychological factors can also influence investment decisions, producing sometimes irrational or non-economical results. Thus, for example, the so-called "lottery effect" may encourage some to over-invest in highly speculative technologies that have the seductive allure of potentially huge economic rewards, but very little if any realistic probability of success. Yet others may fail to take full advantage of lucrative patent investment opportunities because of fundamental misunderstandings or misinformation concerning the effective use and exploitation of patents. The statistical model assumes any such irrationalities or other perturbations follow a normal distribution and, therefore, "average out" in a sufficiently large sample population.

The invention further assumes that patent values are likely to follow a defined or definable probability distribution, such as a normal or lognormal probability distribution. Patents, like stocks, bonds and other intangible assets, possess no inherent or intrinsic value. They are valued based on what they can produce or provide to the holder of the asset in terms of a future return on investment. If these returns are normally distributed (as one would expect) then the underlying value of a randomly selected sample of such assets should follow essentially a lognormal probability distribution. This conforms with standard statistical modeling of expected price distributions of primary financial instruments. See, S. Benninga, Financial Modeling, 2nd Ed., MIT Press (2000).

The invention further recognizes that a statistical relationship can be formulated between observed patent maintenance rates and the probable distribution of patent values implied by those observations. For example, using one embodiment of the invention we are able to derive the estimated value distribution curve 110 shown in FIG. 2. This roughly approximates the probability distribution of expected patent values for a random sample of patents that were issued in 1986.

Figure 2:
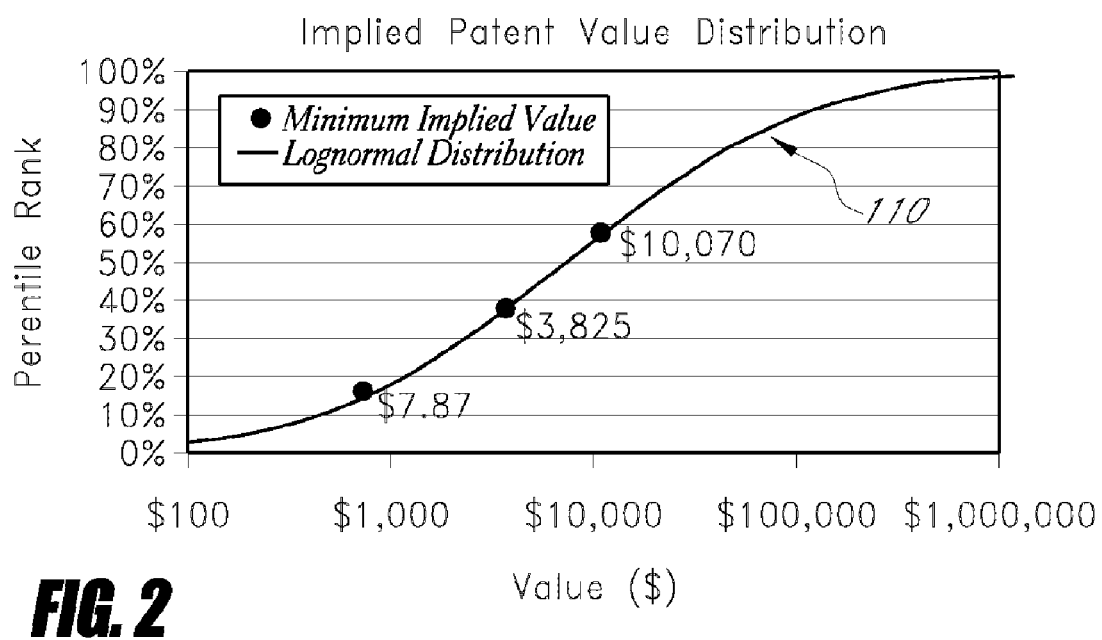
FIG. 2 is an estimated value distribution curve roughly approximating the probability distribution of expected patent values for a random sample of patents issued in 1986.

FIG. 2 is based on reported PTO maintenance data for a sample population of about 70,000 patents issued in 1986. Data points were calculated representing threshold or minimum cut-off values for each of three sub-populations consisting of patents maintained through the $4^{th}$, $8^{th}$ and $12^{th}$ years, respectively. Cut-off values were calculated as a simple sum of fixed annual net revenues taken over the life of the patent. Net annual revenues were calculated according to the minimum amount required to economically justify payment of the last-paid maintenance fee given the remaining life of the patent. For example, a patent owner considering whether to pay the 3rd maintenance fee (blended, adjusted rate of $2,962) to maintain a patent beyond the 12th year would need fixed annual net revenues of $592 ($2,962 divided by 5 years of patent life remaining) to break even on the investment. Multiplying this amount by 17 years (full patent term in 1986) yields an implied minimum cut-off value of roughly $10,070 (assuming evenly distributed annual returns). A lognormal probability distribution curve was then fitted to the calculated data using a least squares fit.

For ease of description and understanding a very simple patent income model is assumed, as described above. Those skilled in the art will readily appreciate obvious improvements to this model, such as varying or adjusting the model according to technology cycle time, product life cycles, product development cycles, patent age, forward citation rate, various stock market correlations, option pricing theories, etc.

According to the model the bottom 10% of patents (10th percentile and below) in the sample population had an implied value at issuance equal to or less than about $430 (in 2001 inflation-adjusted dollars). The top 10% of patents (90th percentile and above) had an implied value greater than about $112,500. The fitted lognormal curve correlates to an expected median value of $6,930 and a mean value of $73,340. Table 1, below, is a summary of patent values and percentage contributions to total value by percentile, according to the model.

TABLE 1

| Percentile | Implied Value | % Total Value |
|---|---|---|
| 1.000% | $ 45 | 0.01% |
| 5.000% | $ 195 | 0.02% |
| 10.000% | $ 430 | 0.19% |
| 25.000% | $1,606 | 1.28% |
| 50.000% | $6,960 | 5.21% |

TABLE 1-continued

| Percentile | Implied Value | % Total Value |
|---|---|---|
| 75.000% | $ 30,000 | 12.0% |
| 90.000% | $ 112,500 | 11.2% |
| 95.000% | $ 247,500 | 26.3% |
| 99.000% | $ 1,090,000 | 25.9% |
| 99.900% | $ 5,700,000 | 11.8% |
| 99.990% | $22,400,000 | 4.3% |
| 99.999% | $73,300,000 | 1.8% |

Figure 3:
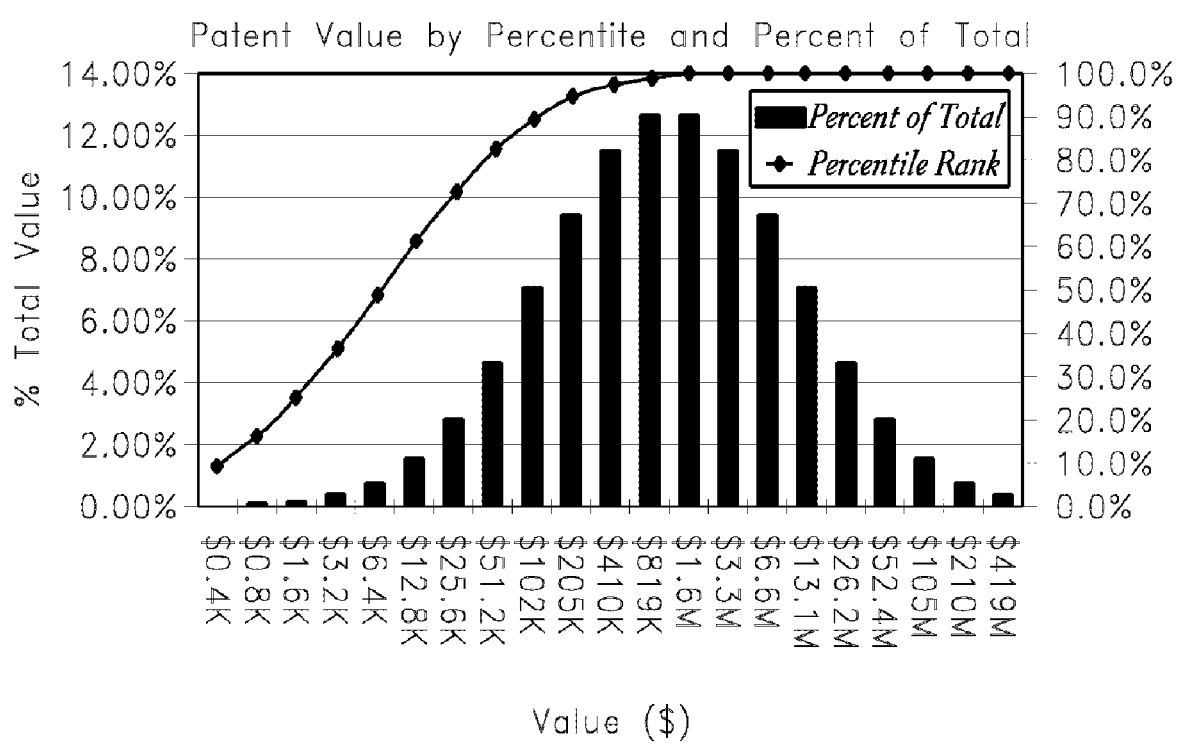
FIG. 3 is an probability distribution of expected patent values (x-axis, logarithmic scale) and corresponding percentage contributions to total aggregate patent value (y-axis) according to the invention.

The aggregate implied value of all 70,860 patents issued in 1986 was about $5.2 billion ($3.2 billion in 1986 dollars) according to the model, with about 780 patents valued in excess of $1 million accounting for about 55% of this amount. FIG. 3 illustrates an estimated probability distribution of expected patent values (x-axis, logarithmic scale) and corresponding percentage contributions to total aggregate patent value (y-axis) according to the statistical model. Patents having estimated values between about $580K and $2.4M (middle two bars, average=$1.1M) account for approximately 25% of the total aggregate implied value of the sample population. Patents having estimated values less than about $25,000 (about 72% of the sample population) account for only about 6% of the total aggregate value according to the model. Thus, the model supports the view, long held by many in the field, that patent values are highly skewed. See Hall, Innovation and Market Value, Working Paper 6984 NBER (1999). A relatively large number of patents appear to be worth little or nothing while a relatively small number appear to be worth a great deal.

Alternatively, the shape and/or magnitude of the estimated value probability distribution curve 110 may be derived from other information and/or factors such as, but not limited to, various macro-economic models, GNP percentage factoring, or other economic models or information sources. Other assumed probability distributions may also be used, such as modified lognormal, poison, normal, logistic, gausian, etc. For example, the shape and magnitude of the curve 110 it may be approximated as a lognormal percentage distribution of total GNP, or as a percentage of total market capitalization of publicly traded companies owning patents, or as a multiple of annual budgeted PTO fees and costs, and/or the like.

Advantageously, the above-described allocative valuation approach brings an added level of discipline to the overall valuation process in that the sum of individual patent valuations for a given patent population cannot exceed the total aggregate estimated value of all such patents. In this manner, fair and informative valuations and corresponding management decisions can be provided based on the relative quality of the patent asset in question with or without comparative market data of other patents or patent portfolios, and with or without a demonstrated (or hypothetical assumed) income stream. Estimated valuations are based simply on the allocation of a corresponding portion of the overall patent value "pie" as represented by each patents' relative ranking or position along value distribution curve 110.

The statistical model described above can be used to directly calculate estimated probability distributions of expected values for relatively large sample populations (thousands of patents) for which maintenance fee data is available. Moreover, once the shape and magnitude of the value distribution curve 110 is defined, the model can also be used to calculate estimated or expected values for individual patent assets or subsets of patents that may be of interest. This can be effectively accomplished using any one or a number of patent ranking systems.

As a hypothetical example, assume a patent expert were to study a random sample of a thousand patents, ranking them from least desirable to most desirable. Such rankings could be based on any one or more of a myriad of subjective and/or objective factors such as: perceived utility and advantages of the invention; size and growth prospects of the relevant market; licensing prospects; patent term remaining; scope of legal rights; likelihood of litigation success; etc. A probability distribution of expected patent values for the sample population could be formulated as described above using available PTO maintenance data. Baseline valuations for individual patents in the population could then be estimated by mapping each patent to the value distribution curve (for example, FIG. 2) according to its determined percentile ranking. Patents having the highest percentile rankings would be correlated to the high end of the value distribution curve. Conversely, patents having the lowest percentile rankings would be correlated to the low end of the value distribution curve.

In the above hypothetical, a human decision-maker comparatively ranks selected patents. But, useful rankings can also be derived from PTO maintenance records by determining and exploiting statistical correlations between patent maintenance rates and certain objective attributes or "metrics" revealed by the patent, its file history and/or other associated public records. See, for example, co-pending U.S. application Ser. No. 09/661,765 filed Sep. 14, 2000, now issued U.S. Pat. 6,556,992, and hereby incorporated herein in its entirety.

By way of example, Table 2 below summarizes observed maintenance rates for patents categorized by the PTO in different technology classes:

TABLE 2

| Class | Description | Maint. Rate |
|---|---|---|
| 482 | Exercise Equipment | 21% |
| 473 | Golf Clubs/Equipment | 26% |
| 446 | Toys and Amusement Devices | 30% |
| 206/250 | Packaging | 43% |
| 365/364 | Computers | 55% |
| 935 | Genetic Engineering | 56% |

As Table 2 illustrates, patents classified in Class 482 ("Exercise Equipment") had an average maintenance rate of 21% (79% of patents abandoned prior to full term) while patents classified in Class 935 ("Genetic Engineering") had an average maintenance rate of 56% (44% of patents abandoned), and patents classified in Class 935 ("Computers") had an average maintenance rate of 55% (45% of patents abandoned).

Since higher maintenance rates correspond to higher implied values according to the value distribution model, the above data provides a simple, objective basis on which to comparatively value individual patent assets. All other things being equal, patents relating to genetic engineering and computers appear to be statistically more valuable (more likely to be maintained) than patents relating to golf and exercise equipment.

FIGS. 4-8 illustrate similar statistical correlations observed between patent maintenance rates and various other selected patent metrics. The reported statistics are based on $4^{th}$ year maintenance rates for a sample population of about 100,000 patents issued in 1996.

Figure 4:
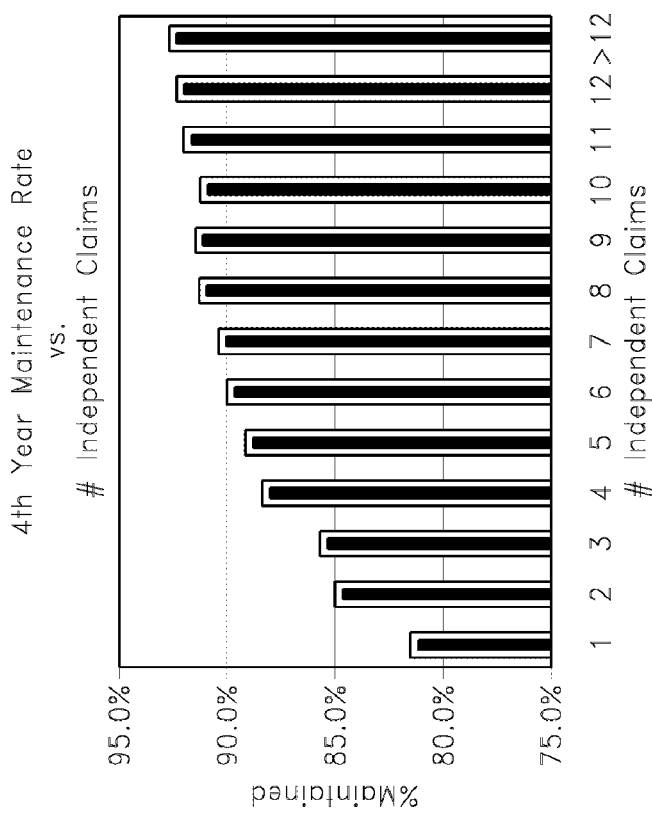
FIG. 4 is a graph of observed patent maintenance rates versus number of independent claims.

FIG. 4 shows that patent maintenance rates generally increase with the number of claims. Patents in the sample population having only one independent claim had an observed $4^{th}$ year maintenance rate of 81.3%, compared to 92.6% for patents having 12 or more independent claims. The data suggests that patents having more independent claims are more valuable. Intuitively this makes sense—the more claims, the broader the likely scope of protection and the better the likelihood of surviving a validity attack.

Figure 5:
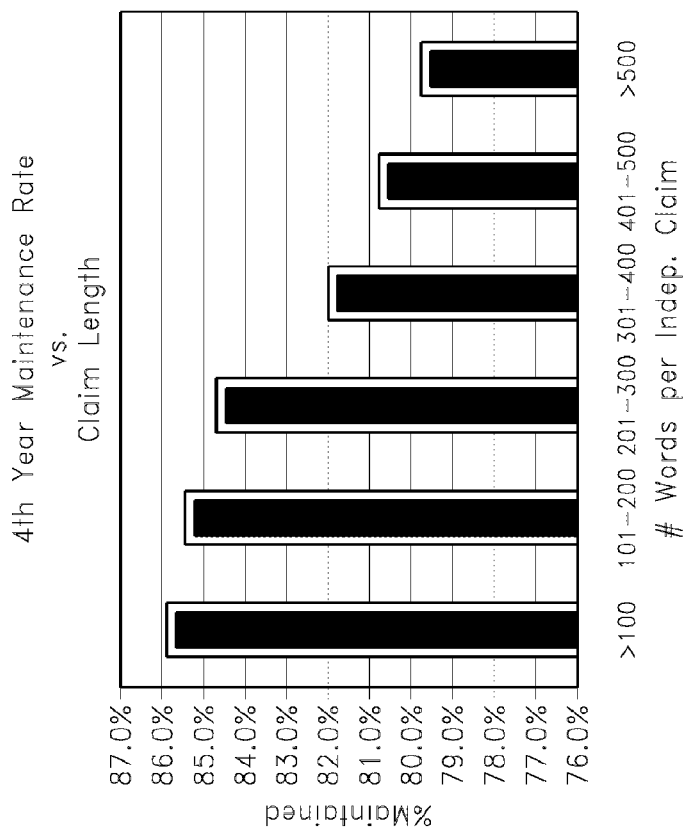
FIG. 5 is a graph of observed patent maintenance rates versus average claim length (number of words per independent claim)

FIG. 5 shows patent maintenance rates generally decrease with claim length (number of words per independent claim). Patents in the sample population having an average word count less than 100 had an observed $4^{th}$ year maintenance rate of 85.9%, compared to 79.7% for patents having an average word count of 500 or more. The data suggests patents having shorter claims are more valuable. Again, this makes intuitive sense—less words means less limitations and, thus, a broader scope of protection.

Figure 6:
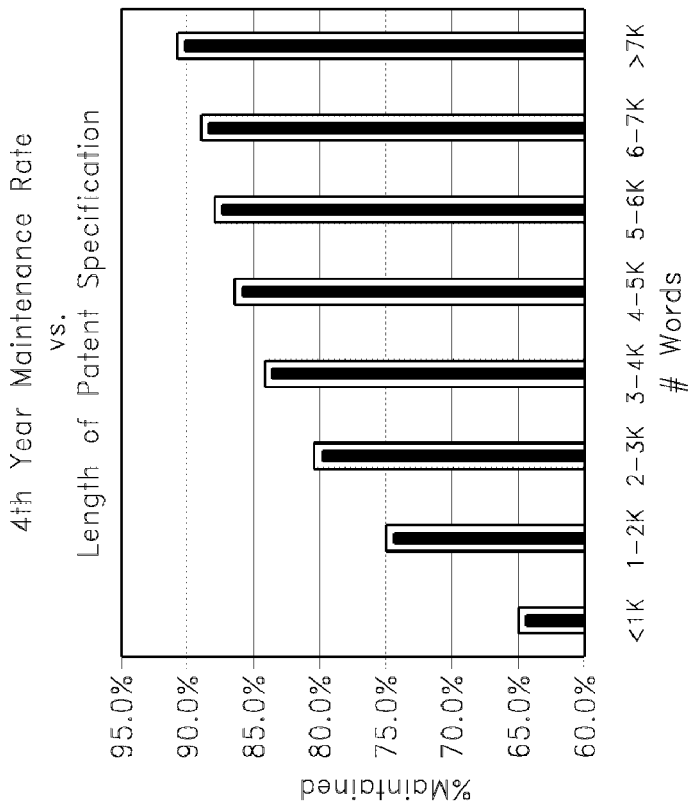
FIG. 6 is a graph of observed patent maintenance rates versus length of written specification.

FIG. 6 shows patent maintenance rates generally increase with the length of written specification. Patents in the sample population having written specifications less than 1,000 words had an observed $4^{th}$ year maintenance rate of 65.5%, compared to 91.0% for patents having written specifications longer than 7,000 words. The data suggests patents having longer written specifications are more valuable. Intuitively, a longer specification provides better support for patent claims and strengthens the patent against certain types of validity attacks. A longer specification may also indicate a higher initial investment in the original patent document (possibly implying a higher initial value expectation on the part of the patent owner/applicant).

Figure 7:
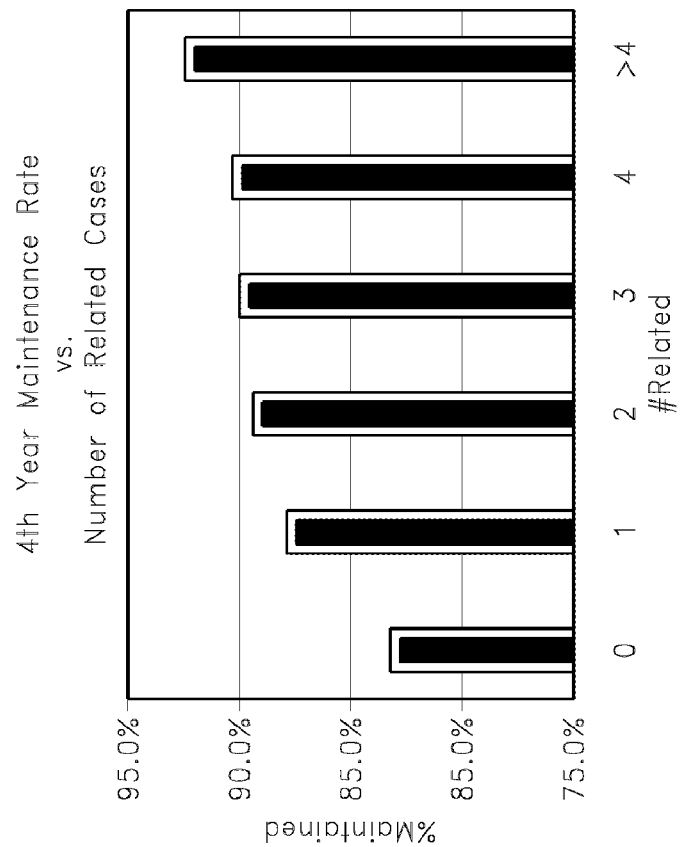
FIG. 7 is a graph of observed patent maintenance rates versus number of recorded priority claims to related cases.

FIG. 7 shows that patent maintenance rates generally increase with the number of recorded priority claims to related cases. Patents in the sample population which made no priority claim to an earlier-filed related case had an observed $4^{th}$ year maintenance rate of 83.1%, compared to 92.4% for patents claiming priority to 5 or more related cases. The data suggests that patents having more priority claims (more related cases) are more valuable. Intuitively, more priority claims probably means a patent is entitled to an earlier filing date, which can be beneficial in fending off art-based validity attacks. It could also indicate a greater level of overall interest and investment by the patentee.

Figure 8:
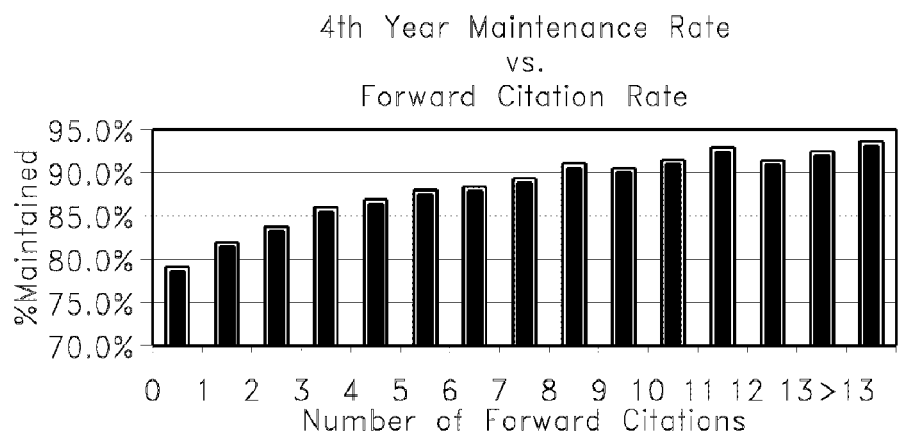
FIG. 8 is a graph of observed patent maintenance rates versus forward citation rate.

FIG. 8 shows that patent maintenance rates generally increase with the forward citation rate. Patents in the sample population that received no forward citations in the first four years had an observed $4^{th}$ year maintenance rate of 79.3%, compared to 93.5% for patents having 14 or more citations. The data suggests that patents receiving more citations are more valuable. Intuitively, a high forward citation rate could indicate a high level of commercial interest or activity in the patented technology.

Each of the individual patent metrics identified above was determined to have a statistically significant correlation ($\alpha<0.001$) with observed patent maintenance rates. While such correlations are interesting and informative, individually they provide only limited guidance in determining overall patent quality. It would be much more useful if we could distill all of the relevant statistical data and derive therefrom a single correlated parameter or rating. Such rating could then be used to directly forecast or estimate the probability or likelihood of a patent being either maintained or abandoned.

A computer regression model was constructed for this purpose. The model comparatively scores individual patent assets based upon all of the identified patent metrics (predictor variables) determined to have a statistically significant correlation to observed patent maintenance rates. Some of the more pertinent metrics include: PTO classification, number of independent and dependent claims, average claim length, shortest independent claim, number of different words per claim, length of written specification, forward citation rate, number and age of cited prior art references, length of prosecution, number and country of origin of related family members, and the presence or absence of specific limiting claim language (for example, "means" clauses and the like). The P-value for the fitted regression model is less than 0.001, indicating a statistically significant relationship at the 99.9% confidence level.

Specifically, the regression model calculates a raw numerical score for each patent according to the extracted metrics for that patent. Raw scores are mathematically adjusted to provide a normalized mean or nominal expected score of 100. This adjusted score, dubbed the "Intellectual Property Quotient" or IPQ, is akin to the familiar Intelligence Quotient or IQ used to score human intelligence. Thus, a score of 100 on the IPQ scale generally corresponds to an expected normal or median quality (average expected maintenance rate). An IPQ higher than 100 indicates above-average quality (higher expected maintenance rate) while an IPQ lower than 100 indicates below-average quality (lower expected maintenance rate).

cies based on survival analysis of statistically similar patents. This may be useful, for example, in guiding patent maintenance decisions, or conducting patent valuation analysis using traditional present value analysis, income valuation analysis or the Black-Scholes options pricing model. Thus, FIG. 9B shows that patent life expectancy generally increases with increasing IPQ. Patents scoring 60 or less on the IPQ scale were predicted to have an estimated life expectancy of 6.7 years, compared with a predicted life expectancy of 17.9 years (full term) for patents scoring 150 or higher. The median life expectancy is about 13.7 years corresponding to an overall average survival rate of about 55.9% and an IPQ score of 100.

Table 3 below tabulates estimated remaining life expectancies for currently maintained utility patents issued in 1996. The notations Y0, Y1, Y2, etc., refer to the age of the patent in years from date of issuance. The notations M1, M2 and M3 indicate scheduled maintenance fee payments for the $4^{th}$, $8^{th}$ and $12^{th}$ years, respectively. Patents in force after Y12 will run full term. Remaining life expectancies for these patents can be directly calculated from the expiration date listed on the patent.

TABLE 3

| IPQ Score | Survival Rate | % of Patents | Y0 | Y1 | Y2 | Y3 | M1 Y4 | Y5 | Y6 | Y7 | M2 Y8 | Y9 | Y10 | Y11 | M3 Y12 |
|---|---|---|---|---|---|---|---|---|---|---|---|---|---|---|---|
| <60 | 11.54% | 0.29% | 6.7 | 5.7 | 4.7 | 3.7 | 6.1 | 5.1 | 4.1 | 3.1 | 6.0 | 5.0 | 4.0 | 3.0 | 5.9 |
| 70 | 10.19% | 5.17% | 7.7 | 6.7 | 5.7 | 4.7 | 6.9 | 5.9 | 4.9 | 3.9 | 6.5 | 5.5 | 4.5 | 3.5 | 5.9 |
| 80 | 25.53% | 14.28% | 10.1 | 9.1 | 8.1 | 7.1 | 8.5 | 7.5 | 6.5 | 5.5 | 7.5 | 6.5 | 5.5 | 4.5 | 5.9 |
| 90 | 41.13% | 21.44% | 12.0 | 11.0 | 10.0 | 9.0 | 9.9 | 8.9 | 7.9 | 6.9 | 8.1 | 7.1 | 6.1 | 5.1 | 5.9 |
| 100 | 55.87% | 24.26% | 13.7 | 12.7 | 11.7 | 10.7 | 10.9 | 9.8 | 8.9 | 7.9 | 8.6 | 7.6 | 6.6 | 5.5 | 5.9 |
| 110 | 68.39% | 15.94% | 15.0 | 14.0 | 13.0 | 12.0 | 11.8 | 10.8 | 9.8 | 8.8 | 9.0 | 8.0 | 7.0 | 6.0 | 5.9 |
| 120 | 82.04% | 9.36% | 16.3 | 15.3 | 14.3 | 13.3 | 12.7 | 11.7 | 10.7 | 9.7 | 9.4 | 8.4 | 7.4 | 6.4 | 5.9 |
| 130 | 88.41% | 5.79% | 16.9 | 15.9 | 14.9 | 13.9 | 13.1 | 12.1 | 11.1 | 10.1 | 9.6 | 8.6 | 7.6 | 6.6 | 5.9 |
| 140 | 93.99% | 2.77% | 17.4 | 16.4 | 15.4 | 14.4 | 13.5 | 12.5 | 11.5 | 10.5 | 9.7 | 8.7 | 7.7 | 6.7 | 5.9 |
| 150 | 100.00% | 0.59% | 17.9 | 16.9 | 15.9 | 14.9 | 13.9 | 12.9 | 11.9 | 10.9 | 9.9 | 8.9 | 7.9 | 6.9 | 5.9 |
| 160 | 100.00% | 0.09% | 17.9 | 16.9 | 15.9 | 14.9 | 13.9 | 12.9 | 11.9 | 10.9 | 9.9 | 8.9 | 7.9 | 6.9 | 5.9 |
| >170 | 100.00% | 0.01% | 17.9 | 16.9 | 15.9 | 14.9 | 13.9 | 12.9 | 11.9 | 10.9 | 9.9 | 8.9 | 7.9 | 6.9 | 5.9 |

Figure 9A:
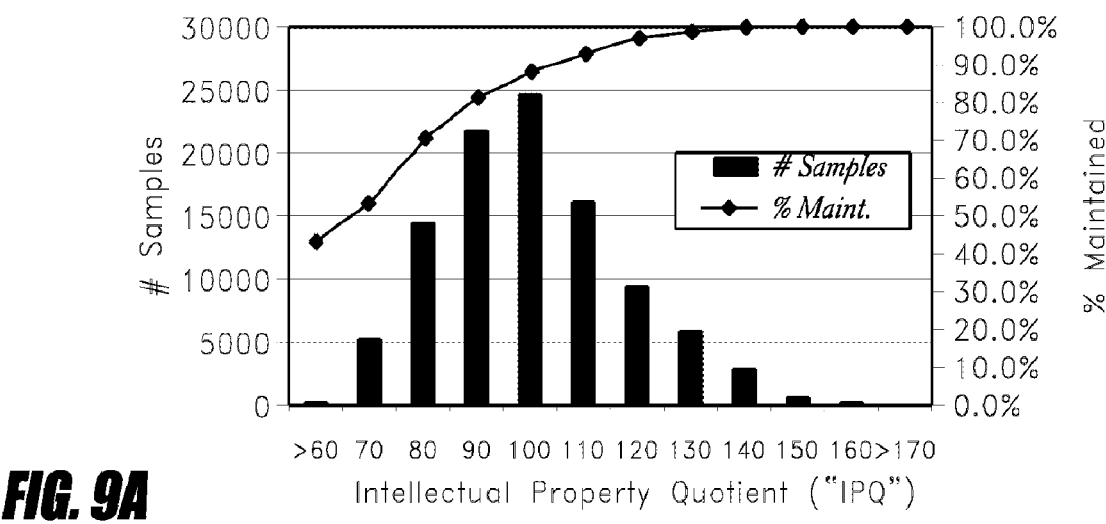
FIG. 9A is a graph showing a statistically determined relationship between a computer-generated patent ranking or IPQ score and observed patent maintenance rates.
Figure 9B:
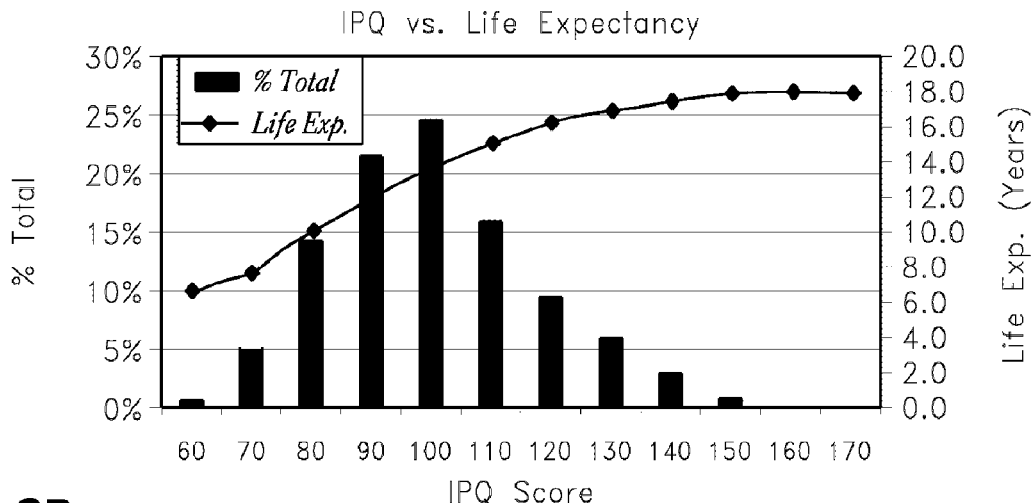
FIG. 9B is a graph showing a statistically determined relationship between a computer-generated patent ranking or IPQ score and patent life expectancy.

FIG. 9A shows the statistical relationship between the computer-generated IPQ scores and actual patent maintenance/abandonment rates. The curve was based on $4^{th}$ year maintenance rates for a sample population of about 100,000 patents issued in 1996. As illustrated by FIG. 9A, observed $4^{th}$ year maintenance rates generally increase with increasing IPQ. Patents scoring 60 or less on the IPQ scale had an observed $4^{th}$ year maintenance rate of 43.7%, compared with observed maintenance rates of 100% for patents scoring 150 or higher. The average $4^{th}$ year maintenance rate for all patents in the sample population was 85.2%.

Figure 10:
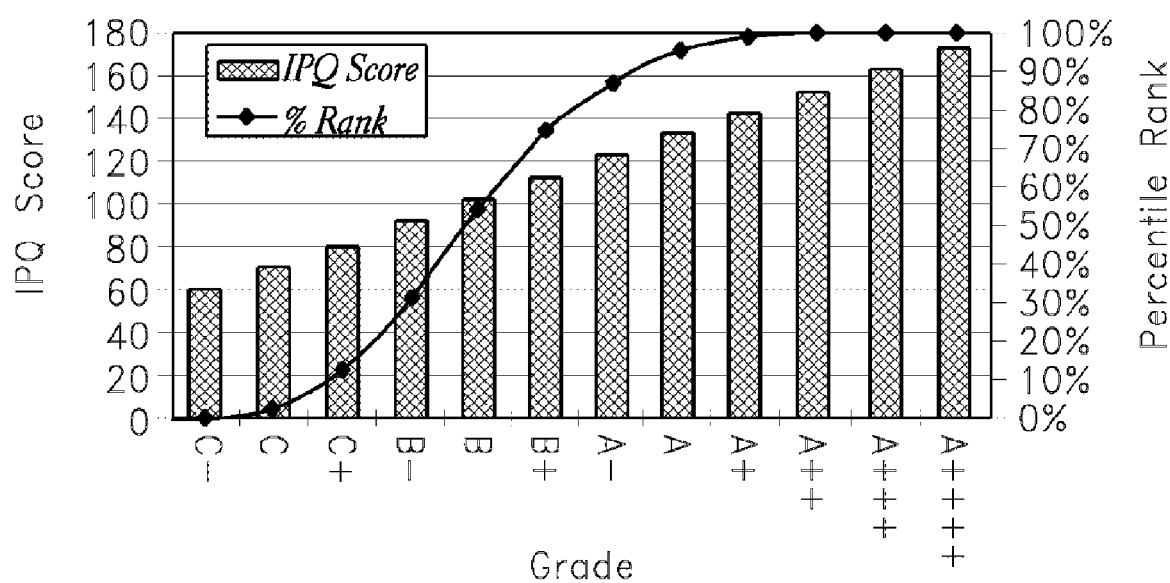
FIG. 10 is a graph showing a statistically determined relationship between a computer-generated IPQ score and corresponding percentile rankings.

IPQ scores cannot only be used to comparatively rank patents, but can also be used to estimate patent life expectan- As a convenient reference, arbitrary letter grades are assigned to each patent according to a percentile ranking of IPQ scores, as illustrated in FIG. 10. Patents ranked between the $40^{th}$ and $60^{th}$ percentiles are assigned a grade of "B" corresponding to a normal or median expected quality. Patents ranked below and above the $40^{th}$ and $60^{th}$ percentiles, respectively, are graded on a bell-curve with a nominal low grade of "C–" (bottom 5%) and a nominal high grade of "A+" (top 5%).

Table 4, below, provides a grading summary for a sample population of patents issued in 1996, including predicted maintenance rates, life expectancies, percentile rankings, average IPQ scores and appraisal values.

TABLE 4

| Grade | Avg. IPQ | Maint. Rate | Life Ex.p (Years) | Percentile Rank | Avg. Exp. Value | # Patents | Total Value ($Millions) |
|---|---|---|---|---|---|---|---|
| C– | 60 | 9.54% | 7.6 | <5% | $114 | 5080 | $ 0.6 |
| C | 68 | 16.7% | 8.8 | 5-10% | $351 | 5080 | $ 1.8 |
| C+ | 77 | 29.9% | 10.7 | 10-25% | $1.1 K | 15239 | $ 16.5 |
| B– | 87 | 41.9% | 12.1 | 25-40% | $3.1 K | 15239 | $ 46.5 |
| B | 97 | 53.5% | 13.4 | 40-60% | $8.3 K | 20319 | $168 |
| B+ | 109 | 61.4% | 14.3 | 60-75% | $22.1 K | 15239 | $338 |

TABLE 4-continued

| Grade | Avg. IPQ | Maint. Rate | Life Ex.p (Years) | Percentile Rank | Avg. Exp. Value | # Patents | Total Value ($Millions) |
|---|---|---|---|---|---|---|---|
| A− | 123 | 72.0% | 15.3 | 75-90% | $66.9 K | 15239 | $1,025 |
| A | 139 | 83.8% | 16.5 | 90-95% | $189 K | 5080 | $ 958 |
| A+ | 155 | 89.9% | 17.0 | 95-99% | $551 K | 4064 | $2,249 |
| A++ | 181 | 96.8% | 17.6 | >99% | $2.4 M | 914 | $2,214 |
| A+++ | 217 | 100% | 17.9 | >99.9% | $11.0 M | 91 | $1,022 |
| A++++ | 221 | 100% | 17.9 | >99.99% | $51.3 M | 10 | $ 523 |
| | | | | | Total Value ($Millions) | | $8,561.8 |

The above data represents average or expected values and life expectancies for a sample population of patents. For individual patents or small portfolios, appropriate value ranges and confidence intervals can be readily calculated for each patent in accordance with known statistical methods. Such information may be used, for example, to support decision-tree ("what if") analysis and/or determine various valuation ranges or event probabilities relevant to the particular patent of interest.

In the particular example illustrated, ratings are provided on a scale from C− to A+. However, a variety of other suitable rating scales may also be used with efficacy, such as numerical rankings, percentile rankings, alphanumeric ratings, absolute or relative probabilities and the like. If desired, individual ratings or rankings may also be combined using a suitable weighting algorithm or the like to arrive at an overall score or rating for a given patent, patent portfolio or other intellectual property asset. The particular weighting algorithm used would preferably be developed empirically or otherwise so as to provide useful and accurate overall patent rating information for a given application such as investment, licensing, litigation analysis, etc.

For investment purposes, for example, overall ratings may be provided in the form of convenient bond-style ratings as summarized in Table 5 below:

TABLE 5

| Quality | Rating |
|---|---|
| Highest quality | AAA |
| High quality | AA |
| Medium-high quality | A |
| Upper medium quality | BBB |
| Medium quality | BB |
| Lower medium quality | B |
| Medium-low quality | CCC |
| Low quality | CC |
| Lowest quality | C |

Tables 6 and 7 below provide a more-or-less random sampling of patents rated high (A+) and low (C−), respectively, according to the model:

TABLE 6

(Patents Rated A+)

| Patent No. | Class/ Subclass | Title | Assignee |
|---|---|---|---|
| 5,521,720 | 358/448 | Image processing apparatus for changing the resolution upon rotation of the image | Kaisha Canon Kabushiki |
| 5,528,482 | 363/21.06 | Low loss synchronous rectifier for application to clamped-mode power converters | AT & T Corp. |
| 5,530,518 | 355/53 | Projection exposure apparatus | Nikon Corporation |
| 5,548,646 | 713/153 | System for signatureless transmission and reception, of data packets between computer networks | Sun Microsystems Inc. |
| 5,559,481 | 333/193 | Surface acoustic wave filter | Fujitsu Limited |
| 5,559,535 | 347/14 | Temperature control of ink-jet recording head using heat energy | Canon Kabushiki Kaisha |
| 5,572,232 | 345/581 | Method and apparatus for displaying an image using subsystem interrogation | Intel Corporation |
| 5,583,591 | 396/429 | Photographic camera system | Sony Corporation |
| 5,590,032 | 363/15 | Self-synchronized drive circuit for a synchronous rectifier in a clamped-mode power converter | Lucent Technologies Inc. |
| 5,590,342 | 713/324 | Method and apparatus for reducing power consumption in a computer system using virtual device drivers | Intel Corporation |

TABLE 7

(Patents Rated C+)

| Patent No. | Class/ Subclass | Title | Assignee |
|---|---|---|---|
| 5,487,601 | 312/183 | Baseball card storage and protection device | Unassigned |
| 5,490,821 | 601/134 | Massage device for the soles of the feet | Unassigned |
| 5,490,824 | 482/60 | Limb exerciser | Unassigned |
| 5,502,907 | 40/711 | Innovated frame fixation structure | Unassigned |
| 5,505,524 | 297/440.24 | Portable hair styling and barber chair | Unassigned |
| 5,509,392 | 123/516 | Anti-vapor lock fuel system | Unassigned |
| 5,509,775 | 414/437 | Self loading cargo vehicle | United States (U.S. Army) |
| 5,509,874 | 482/75 | Stilt assembly having adjustable mechanism | Unassigned |
| 5,520,564 | 446/15 | Large bubble producing toy | Unassigned |
| 5,522,573 | 248/118 | Arm Brace | Unassigned |

In an alternative embodiment, once an estimated value for a single patent asset is determined, the estimated value can be converted to a non-currency-denominated scale. In one embodiment, such a non-currency-denominated scale may be centered on 1000. The standard measurement unit can be the average (or alternatively the median) value of a newly issued U.S. utility patent. For example, if newly issued U.S. utility patents have an average estimated value of $250K, this translates to a converted score of 1000. A particularly "good" patent that would previously have received an estimated value of $2.5 million would now get a converted score of 10,000. A particularly "bad" patent that would previously have received an estimated value of $2,500 would now get a converted score of 100.

In some embodiments, the converted score can be adapted to account for the relative value depreciation of a patent over time based on the calculated obsolescence rate for the particular technology. U.S. patent application Ser. No. 60/714,713, filed on Sep. 7, 2005 describes embodiments of a system for determining a rate of technology obsolescence from patent citation information and is hereby incorporated by reference in its entirety.

In some embodiments, the methods described herein can be used to develop comparable objective quality ratings and value estimations for patents in any country or jurisdiction in the world. Value estimation scores for patents in any country or jurisdiction can be converted to a single scale, which can be weighted to remove the effects of exchange rates, thereby allowing objective comparison of the value of patents from any country or jurisdiction.

This information can be gathered and compiled to form a country-by-country or jurisdiction-by-jurisdiction floating exchange index that will allow direct comparison of patents from around the world. For example, U.S. utility patents may have an average converted value score of 1000; while Japanese patents may have an average converted value score of 700, indicating a patent exchange rate of 0.7; South African patents may have an average converted value score of 50, indicating an exchange rate of 0.05. In one embodiment, the exchange rates can be based on actual financial exchange rates, and can be updated as frequently as desired. In an alternative embodiment, the exchange rate used in the conversion can be set periodically using an algorithm for measuring the relative demand for patents in each country or jurisdiction throughout the world, thereby establishing an exchange rate for patents as a form of currency.

A patent is typically registered in and subject to enforcement in a particular jurisdictions. In some cases, an invention may be disclosed in multiple patents registered in multiple jurisdictions. Furthermore, a patent registered in a first jurisdiction may in some cases be subject to enforcement in a second jurisdiction. As used herein, the distinctions between various "jurisdictions" can be understood in various ways according to various embodiments of the present invention. In one embodiment, a jurisdiction can be an internationally recognized sovereign nation, such that a first internationally recognized sovereign nation would be distinct from a second internationally recognized sovereign nation. In another embodiment, a jurisdiction can be a collection of sovereign nations having a collaborative patent registration system, a common official currency, and/or delegated sovereignty through international treaty. For example, the United States may be considered a first jurisdiction and those countries that are party to the European Patent Convention may be considered to form a second jurisdiction. In yet another embodiment, various jurisdictions may have differing patent enforcement systems, such that France may be considered a first jurisdiction and Italy may be considered a second jurisdiction. As international treaties and patent practices develop, it is understood that various patent registration and enforcement jurisdictions may evolve. Various embodiments of the present invention can be applied to various conceptions of jurisdiction without departing from the scope of the present invention.

While the statistical rating and valuation method and system of the present invention is disclosed and discussed specifically in the context of U.S. utility patents, those skilled in the art will readily appreciate that the techniques and concepts disclosed herein may have equal applicability for valuing other types of intellectual property assets, such as trademarks, copyrights, trade secrets, domain names, web sites and the like, and/or other types of intangible or tangible assets.

Figure 11:
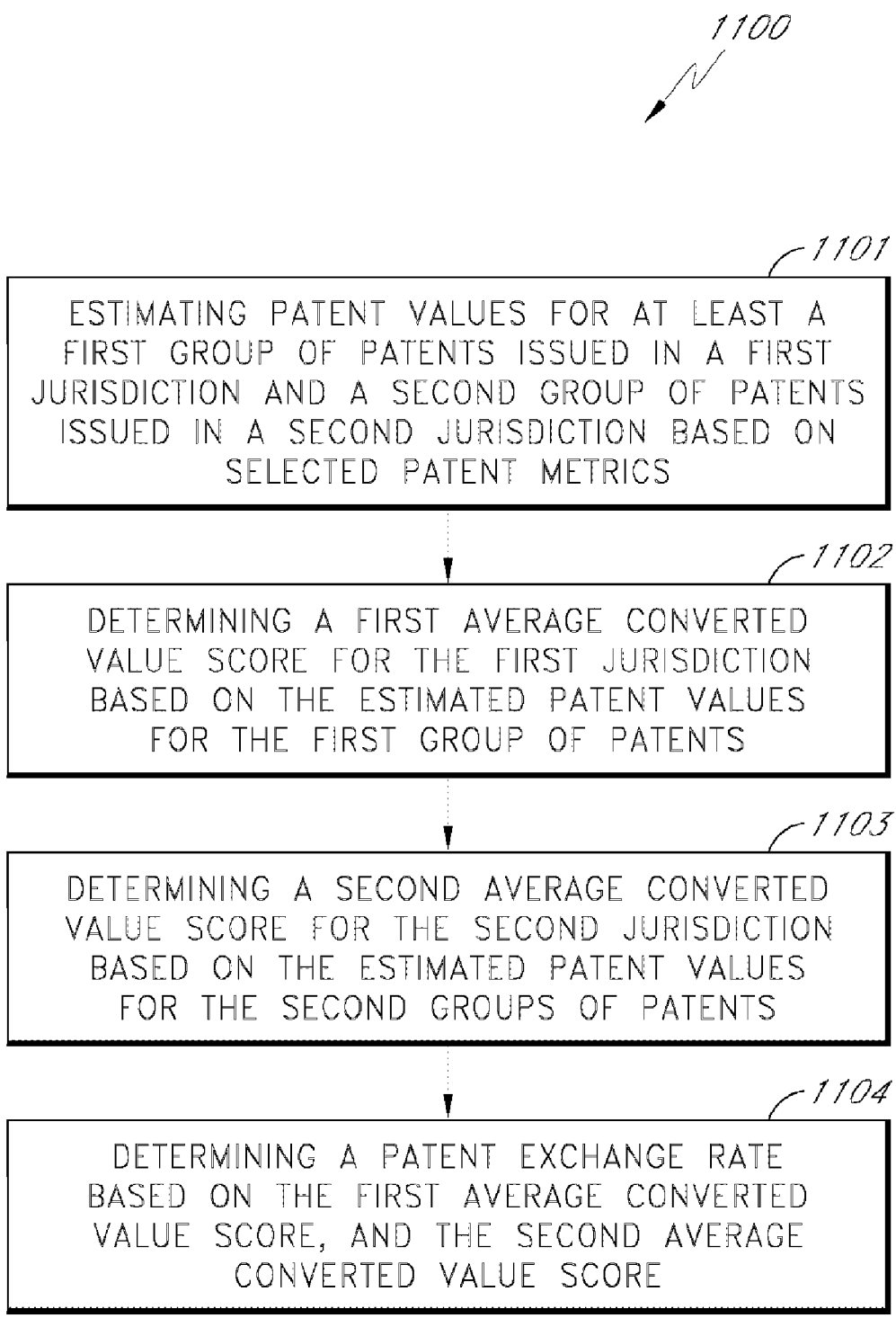
FIG. 11 is a flowchart of a method for comparing patent values between jurisdictions.

FIG. 11 is a flowchart of a method 1100 for comparing patent values between jurisdictions. Step 1101 comprises estimating patent values for at least a first group of patents issued in a first jurisdiction and a second group of patents issued in a second jurisdiction based on selected patent metrics. Step 1102 comprises determining a first average converted value score for the first jurisdiction based on the estimated patent values for the first group of patents. Step 1103 comprises determining a second average converted value score for the second jurisdiction based on the estimated patent values for the second groups of patents. Step 1104 comprises determining a patent exchange rate based on the first average converted value score, and the second average converted value score. Steps 1102 and 1103 can be completed either in parallel or sequentially, in whichever order.

In some embodiments, it is contemplated that some or all of the steps described herein may be implemented within, or using, software modules (programs) that are executed by one or more general purpose computers. In these embodiments, the software modules may be stored on or within any suitable computer-readable medium. It should be understood that the various steps may alternatively be implemented in-whole or in-part within specially designed hardware.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof Thus, it is intended that the scope of the present invention herein disclosed should not be limited by the particular disclosed embodiments described above, but should be determined only by a fair reading of the claims that follow.

What is claimed is:

1. A computer-implemented method for comparing patent values between jurisdictions, wherein each jurisdiction comprises respective local laws that may affect the patent values, the computer-implemented method comprising:

estimating, by a computer system, patent values for at least a first group of patents, issued in a first jurisdiction based on a model to consider selected patent metrics and an effect of laws local to the first jurisdiction on patent values for the first group of patents, wherein estimating patent values of the first group of patents comprises:

estimating, by the computer system, a value distribution curve, the shape of the value distribution curve is determined to correspond to an estimated statistical distribution of expected patent values;

determining, by the computer system, a score for said first group of patents based on one or more metrics determined to be statistically correlated to patent value;

using, by the computer system, the determined score and the estimated value distribution curve to determine expected values for said first group of patents, wherein said determined expected values are functionally correlated to said determined score;

converting, by the computer system, the estimated expected values to a non-currency-denominated scale;

estimating, by the computer system, patent values for a second group of patents issued in a second jurisdiction based on the model to consider selected patent metrics and an effect of laws local to the second jurisdiction on patent values for the second group of patents;

determining, by the computer system, a first average converted value score for the first jurisdiction based on the estimated patent values for the first group of patents;

determining, by the computer system, a second average converted value score for the second jurisdiction based on the estimated patent values for the second groups of patents; and determining, by the computer system, a patent exchange rate based on the first average converted value score and the second average converted value score.

2. The method of claim 1, wherein said first jurisdiction includes a different patent enforcement system than said second jurisdiction.

3. The method of claim 1, wherein said first jurisdiction employs a first official currency and said second jurisdiction employs a second official currency.

4. The method of claim 3, wherein said first official currency is available for purchase with said second official currency based on a currency exchange rate, the method further comprising:

estimating, by the computer system, a value for a first patent, the first patent is subject to enforcement in said first jurisdiction, in terms of said second official currency based at least on said patent exchange rate and said currency exchange rate.

5. The method of claim 1, wherein the selected patent metrics include one or more of the following: number of claims per patent, number of words per claim, different words per claim, length of patent specification, number of drawing pages or figures, number of cited prior art references, age of cited references, number of subsequent citations received, subject matter classification and sub-classification, origin of the patent, payment of maintenance fees, name of prosecuting attorney or law firm, examination art group, or length of pendency in a patent registration office.

6. The method of claim 1, further comprising:

sending, by the computer system, the patent exchange rate to an output device.

7. An apparatus for comparing patent values between jurisdictions, wherein each jurisdiction comprises respective local laws that may affect the patent values, the apparatus comprising:

a processor; and a memory in communication with the processor, wherein the memory stores a plurality of processing instructions for directing the processor to:

estimate patent values for at least a first group of patents issued in a first jurisdiction based on a model to consider selected patent metrics and an effect of laws local to the first jurisdiction on patent values for the first group of patents, wherein the processing instructions for directing the processor to estimate patent values comprises:

estimating a value distribution curve, the shape of the value distribution curve is determined to correspond to an estimated statistical distribution of expected patent values;

determine a score for said first group of patents based on one or more metrics determined to be statistically correlated to patent value;

use the determined score and the estimated value distribution curve to determine expected values for said first group of patents, wherein said determined expected values are functionally correlated to said determined score;

convert the estimated expected value to a non-currency-denominated scale;

estimate patent values for a second group of patents issued in a second jurisdiction based on the model to consider selected patent metrics and an effect of laws local to the second jurisdiction on patent values for the second group of patents, wherein the memory stores the estimated patent values;

determine a first average converted value score for the first jurisdiction based on the estimated patent values for the first group of patents, wherein the memory stores the first average converted value score;

determine a second average converted value score for the second jurisdiction based on the estimated patent values for the group of patents, wherein the memory stores the second average converted value score;

determine a patent exchange rate based on the first average converted value score, and the second average converted value score, wherein the memory stores the patent exchange rate; and send the patent exchange rate to an output device.

8. The apparatus of claim 7, wherein said first jurisdiction includes a different patent enforcement system than said second jurisdiction.

9. The apparatus of claim 7, wherein said first jurisdiction employs a first official currency and said second jurisdiction employs a second official currency.

10. The apparatus of claim 9, wherein said first official currency is available for purchase with said second official currency based on a currency exchange rate, and wherein said memory further stores a plurality of processing instructions for directing the processor to:

estimate a value for a first patent, the first patent is subject to enforcement in said first jurisdiction, in terms of said second official currency based at least on said patent exchange rate and said currency exchange rate; and send the estimated value for the first patent in terms of the second official currency to the output device.

11. The apparatus of claims 7, wherein the selected patent metrics include one or more of the following: number of claims per patent, number of words per claim, different words per claim, length of patent specification, number of drawing pages or figures, number of cited prior art references, age of cited references, number of subsequent citations received, subject matter classification and sub-classification, origin of the patent, payment of maintenance fees, name of prosecuting attorney or law firm, examination art group, or length of pendency in a patent registration office.

* * * * *

UNITED STATES PATENT AND TRADEMARK OFFICE
CERTIFICATE OF CORRECTION

PATENT NO. : 7,657,476 B2 Page 1 of 1
APPLICATION NO. : 11/614878
DATED : February 2, 2010
INVENTOR(S) : Jonathan A Barney It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 269 days.

Signed and Sealed this

Twenty-eighth Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,657,476 B2 | Page 1 of 1 |
| APPLICATION NO. | : 11/614878 | |
| DATED | : February 2, 2010 | |
| INVENTOR(S) | : Jonathan A. Barney | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 269 days.

Title page (Item 57) (Abstract), Line 6, Change "a the" to --the--.

On Sheet 1 of 7 (Fig. 2), Line 1 (x-axis), Change "Perentile" to --Percentile--.

On Sheet 2 of 7 (Fig. 3), Line 1, Change "Perentile" to --Percentile--.

On Sheet 4 of 7 (Fig. 7), Line 4 (x-axis), Change "85.0%" to --80.0%--.

In Column 3, Line 44, Change "lawsuits" to --lawsuits.--.

In Column 7, Line 26 (Approx.), Change "an" to --a--.

In Column 8, Line 23, Change "were" to --was--.

In Column 10, Line 40, Change "gausian," to --gaussian,--.

In Column 11, Line 49, Change "term)" to --term),--.

In Columns 13-14, Line 7 (Table 3), Change "5.5" to --5.6--.

In Columns 13-14, Line 1 (Table 4), Change "Ex.p" to --Exp.--.

In Columns 15-16, Line 9 (Table 4), Change "($Millions)" to --($Millions):--.

In Column 18, Line 41, Change "thereof" to --thereof.--.

In Column 18, Line 53, In Claim 1, change "patents, issued" to --patents issued--.

In Column 19, Line 4, In Claim 1, change "non- currency-denominated" to --non-currency-denominated--.

In Column 19, Line 18, In Claim 1, change "score and" to --score, and--.

Signed and Sealed this
Twenty-fifth Day of January, 2011

David J. Kappos
*Director of the United States Patent and Trademark Office*